Dec. 4, 1951     E. HONGELL     2,577,585
COIN CONTROLLED LIQUID DISPENSING DEVICE
Filed July 17, 1948     6 Sheets-Sheet 1

Inventor
EINO HONGELL
by Jim Haskett
Attorney

Dec. 4, 1951            E. HONGELL            2,577,585

COIN CONTROLLED LIQUID DISPENSING DEVICE

Filed July 17, 1948            6 Sheets-Sheet 3

Inventor
EINO HONGELL
by W. ...... Haskett.
Attorney.

Inventor
EINO HONGELL

Dec. 4, 1951     E. HONGELL     2,577,585
COIN CONTROLLED LIQUID DISPENSING DEVICE
Filed July 17, 1948     6 Sheets-Sheet 6

Inventor
EINO HONGELL
by
Attorney

Patented Dec. 4, 1951

2,577,585

UNITED STATES PATENT OFFICE 2,577,585

COIN-CONTROLLED LIQUID DISPENSING DEVICE

Eino Hongell, Verdun, Quebec, Canada

Application July 17, 1948, Serial No. 39,229

6 Claims. (Cl. 225—21)

This invention relates to improvements in a liquid dispensing apparatus and appertains particularly to a coin-operated, motor-driven mechanism for measuring and dispensing a predetermined quantity of liquid such as soft drinks and the like.

An object of the invention is to provide a liquid vending machine having an exposed glass measuring chamber with valved supply and draw-off conduits synchronized in operation with the former being normally closed and the latter open and the latter being closed for the duration of the open periods of the former.

A further object of the invention is to provide a novel automatic cup feed mechanism supplying a container of the discardable paper type to a position below the spout from the liquid measuring chamber, while the chamber is filling and before the draw-off spout valve opens.

A further object of the invention is to provide a pressure equalizer for the supply reservoir of the liquid dispenser to improve the flow therefrom to the measuring glass chamber, such equalizer operating to supply a measured quantity of air to the sealed liquid reservoir.

A still further object of the invention is to provide a simplified and highly efficient and tamperproof coin-released, gravity-operated circuit closing mechanism to drive the dispensing mechanism, reset it and again break the circuit.

A still further object of the invention is the provision of a cabinet-enclosed, automatic, soft-drink vending machine that has attractive sales appeal, is rapid and reliable in operation, not liable to get out of order and will prove satisfactory and economical in use, whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 7 is a transverse sectional detail of the draw-off valve control as taken on the line 7—7 of Figure 5, looking in the direction indicated by the arrows.

Figure 1:
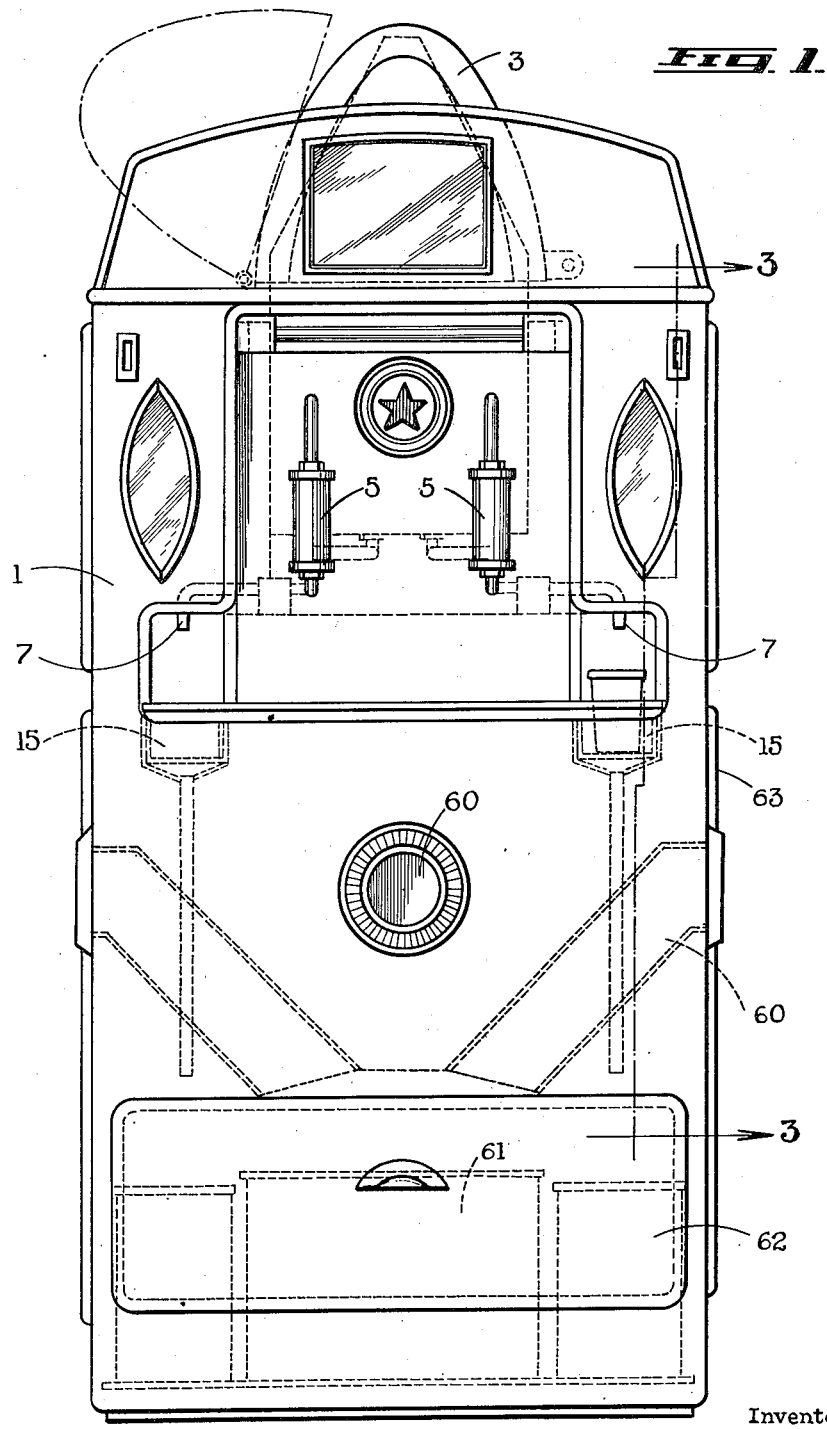
Figure 1 is a front elevation of a preferred embodiment of my liquid dispenser.
Figure 2:
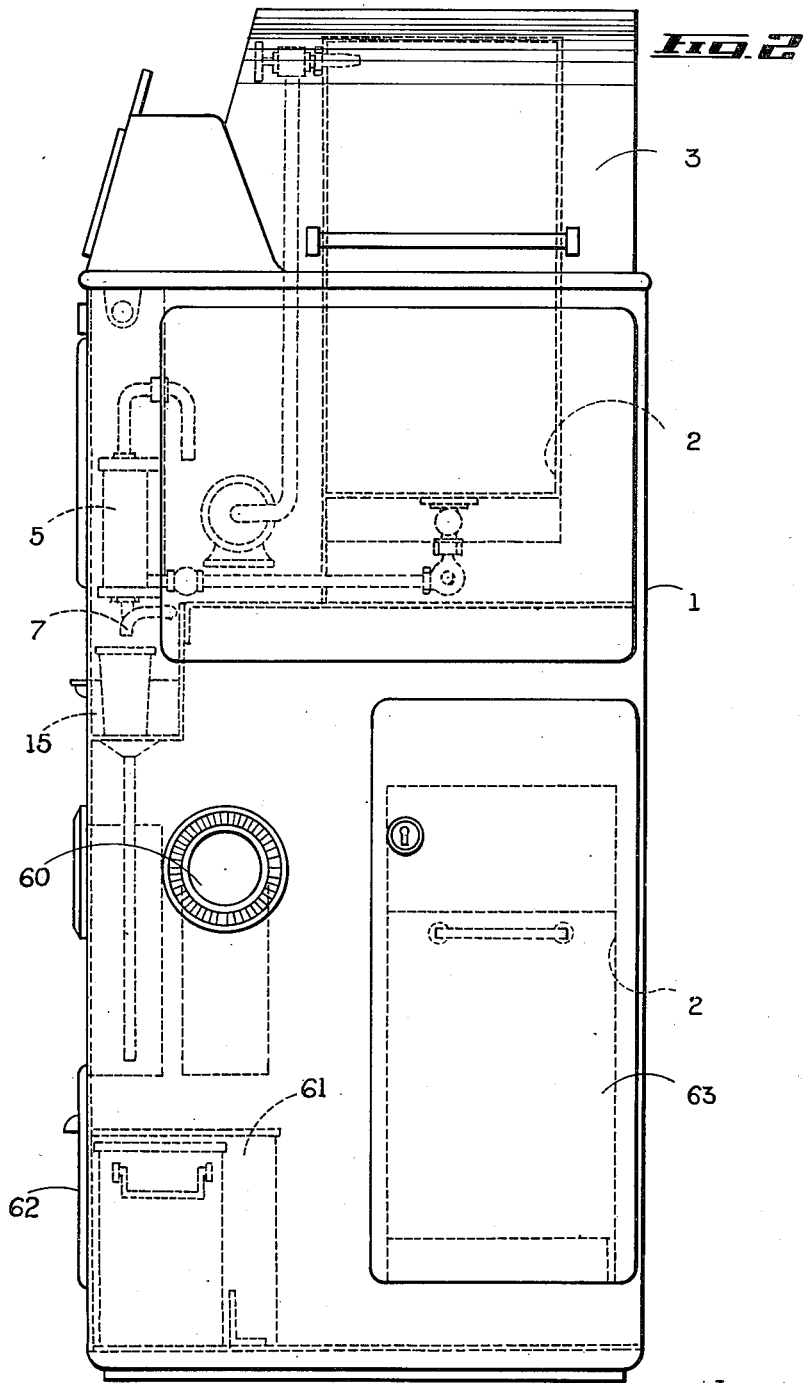
Figure 2 is a side elevation thereof.
Figure 3:
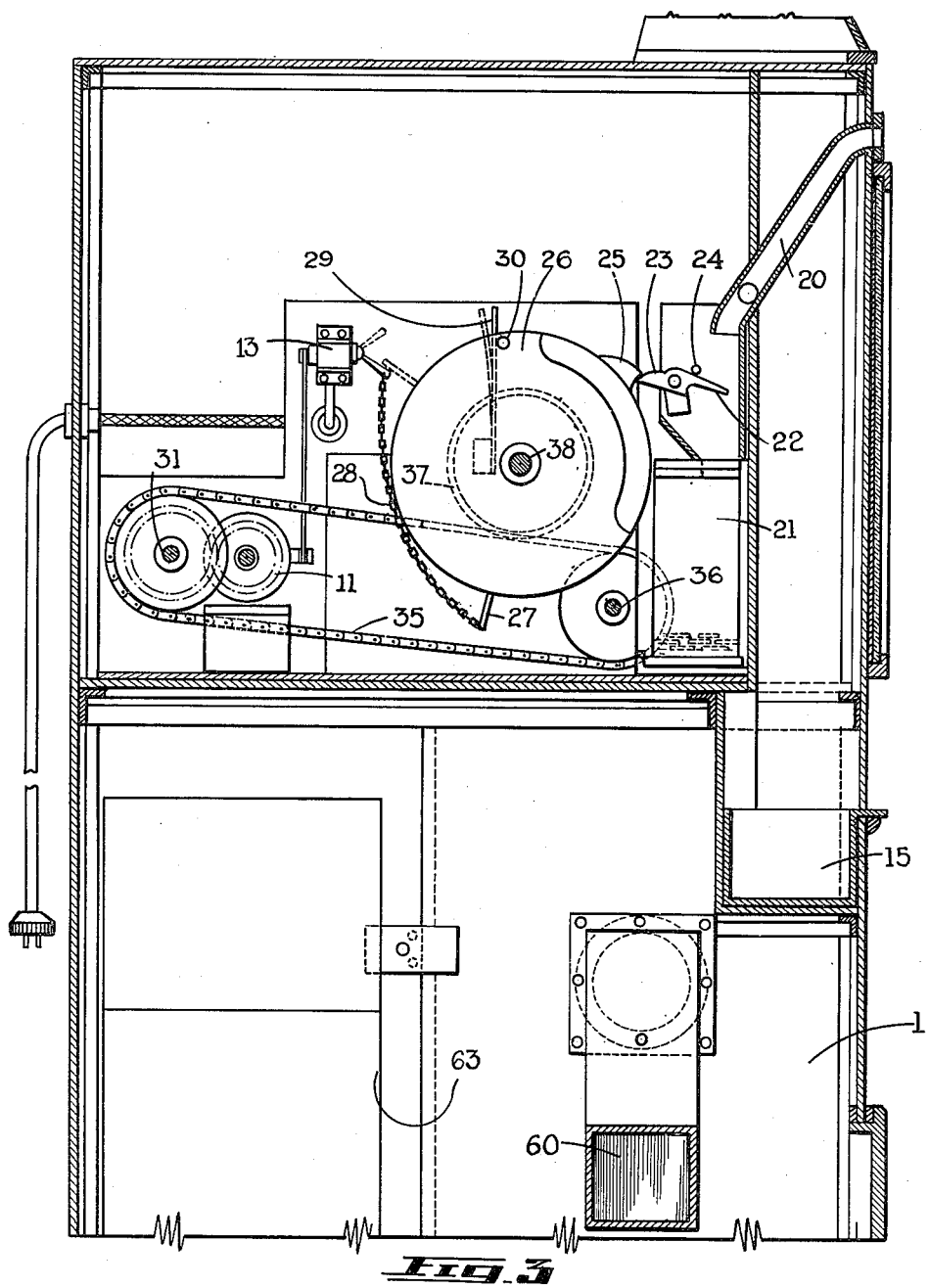
Figure 3 is an enlarged vertical section, substantially as taken along the line 3—3 of Figure 1, showing the coin released and resetting mechanism.
Figure 4:
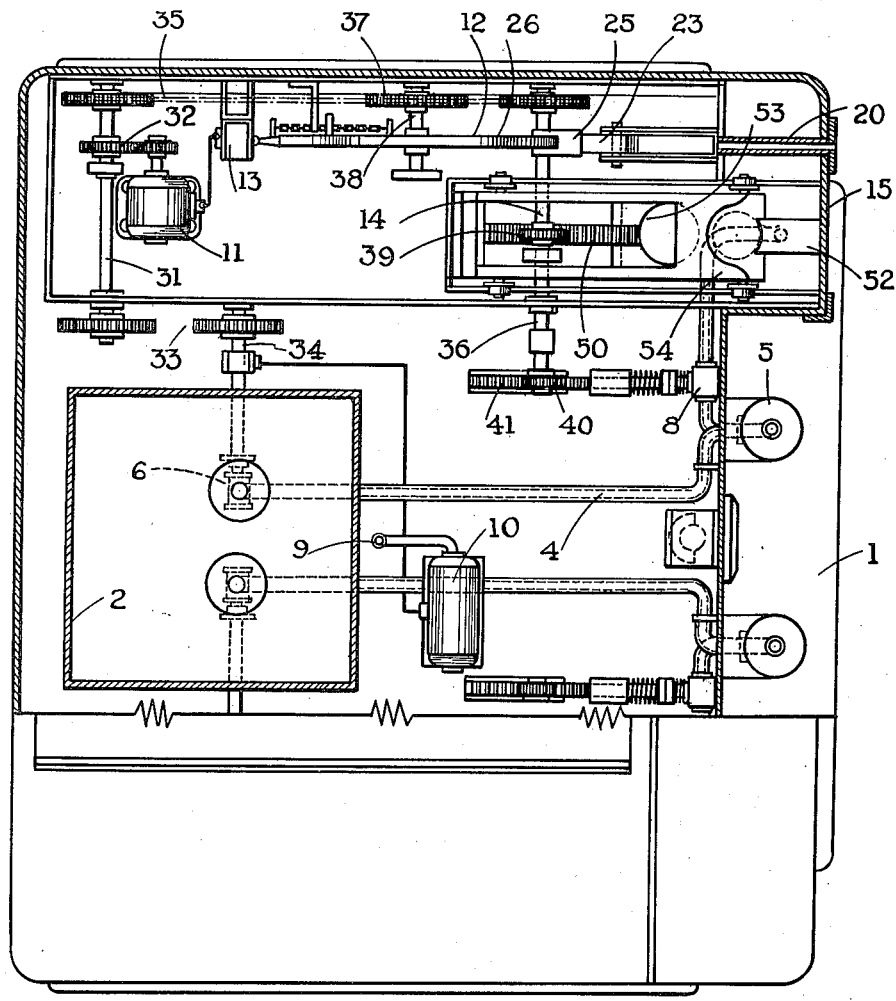
Figure 4 is a horizontal section through the machine.

The device comprises a handsome cabinet 1 in which a replaceable liquid reservoir 2 is supported, access thereto being afforded through a cover 3 hinged on the top of the cabinet. The reservoir 2 feeds through a pipe 4 to a clear glass measuring cylinder 5, exposed exteriorly of the cabinet, through a normally spring-closed valve 6. Withdrawal from the measuring chamber 5 is by a spout 7 controlled by a normally spring opened valve 8. Since the reservoir 2 may be airtight, I propose supplying air thereto through an air line 9 by a motor driven pump 10 to replace the liquid tapped off.

By an electric motor 11 and a coin-released mechanism 12 controlling such motor through a circuit closer 13, the reservoir valve 6 and draw-off faucet valve 8 are oppositely actuated and the air-feed pump 10 motivated. Additionally such motor and mechanism 11 and 12 drive a cup-dispensing device 14 that feeds a single receptacle of the disposable paper cup type into a shallow well 15, recessed in the face of the cabinet 1 and below the faucet 7, during the period the reservoir 2 is filling the measuring cylinder 5 and whilst the draw-off valve 8 is temporarily closed.

Coin-releasing mechanism

For convenience the actuating mechanism is disposed laterally of the reservoir 2 and in the instant disclosure of a "double machine," a bank of such mechanism occurs on each side of the large tank that occupies a rear central position. A coin tube 20 open to the front of the cabinet 1 declines rearwardly toward a collecting receptacle 21 with the elongated tail 22 of a self-setting trigger 23 across the line of a coin falling from the tube 20 to the receptacle 21 and held in normal set position by a stop 24.

This coin-tripped trigger acts as a "stop" for a projecting dog 25 on a weighted wheel 26 that is provided with a radial arm 27 that snaps the circuit closer 13 and is also connected to it by a length of chain 28 to break the circuit when the machine is reset. A stabilizer in the form of a vertical spring leaf 29 is engaged by a pin 30 projecting laterally from the wheel 26 near its periphery and cushions the braking of the resetting motion of the mechanism.

Motor drive

The motor 11 is geared to a transverse shaft 31 by a one-way gear pinion 32 and from this shaft a chain drive 33 connects with the shaft 34 reaching to the normally closed reservoir valve 6. A second chain drive 35 runs forward from the shaft 31 to a cross shaft 36 and in doing so passes under a chain sprocket gear 37 on the weighted wheel shaft 38. The cross shaft 36 carries two pinions 39 and 40; the first connecting with the cup dispenser 14 and the second engaging a sliding rack 41 with a spring-cushioned plunger 42 on its forward end to engage and close the faucet valve 8.

Cup dispenser

Figure 6:
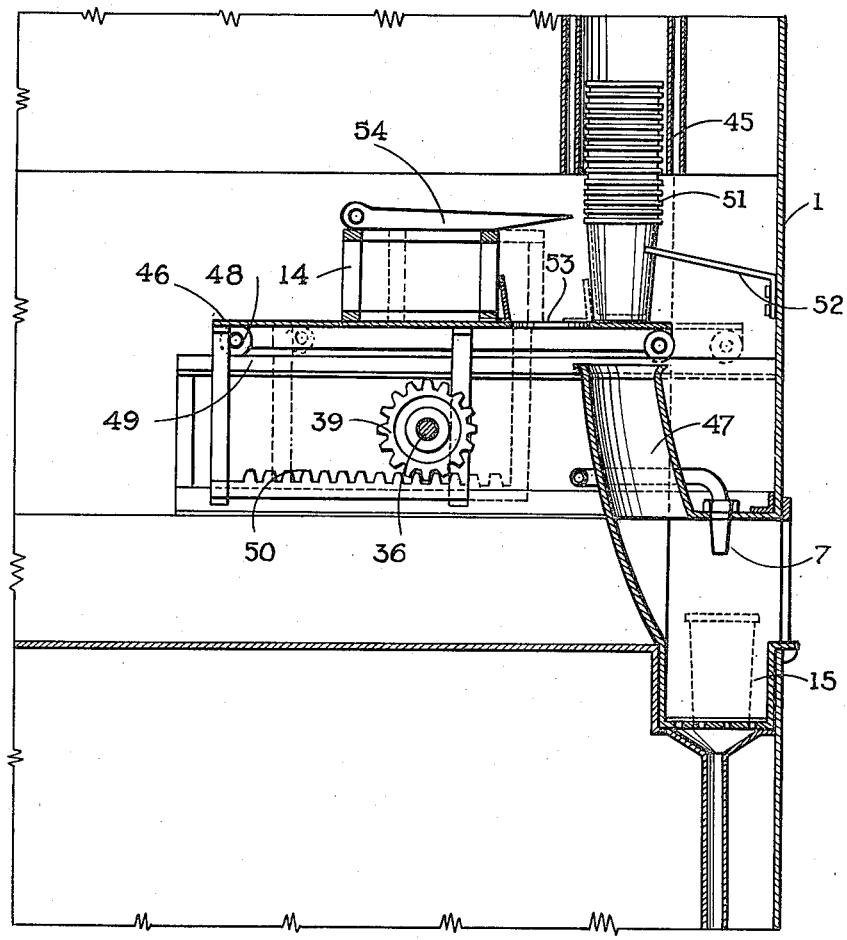
Figure 6 is a further enlarged vertical section showing the cup feeding mechanism.

The automatic cup-dispensing mechanism 14, shown particularly in Figure 6, includes a vertical supply stack 45, a reciprocating feed carriage 46 and a delivery chute 47 commencing in vertical registry with but spaced below the stack and leading to the well 15, below the faucet 7. The carriage 46 is provided with wheels 48 that run on laterally spaced horizontal frame rails 49. A rack bar 50 suspended from the wheeled carriage is engaged by the pinion 39 on cross shaft 36 hereinbefore mentioned. In its retracted position the platform of the carriage 46 underlies the cup-supply stack 45 and a column of cups contained therein and numbered 51 rests on the platform. An inclined brace 52 extending rearwards from the front wall of the cabinet 1 engages the forward side of the bottom cup. To the rear of the stack of cups, the carriage platform is provided with a large centrally located circular opening 53 of greater diameter than the top rim of one of the cups so that as the carriage is moved forwards to bring the opening into registry with the stack 45 and the mouth of the chute 47, the cups 51 held against forward displacement by the brace 52 will drop therethrough. That only one cup be dispensed at a time, a bifurcated separator 54 is mounted the height of a cup above the carriage platform and normally retracted clear of the stack of cups. As the carriage is advanced this bifurcated and tapered separator moves in between the superposing and nearly engaging rims of the bottommost and second-from-the-bottom cup until by the time the carriage opening 53 registers with the cup stack and chute, the second-from-the-bottom cup is safely supported in the separator cradle and only the bottommost cup drops into the well. On the carriage's return to retracted position the separator is drawn clear of the stack of cups so the formerly second-from-the-bottom and now bottommost cup drops onto the forward end of the carriage platform, in advance of the feed opening 53.

Figure 5:
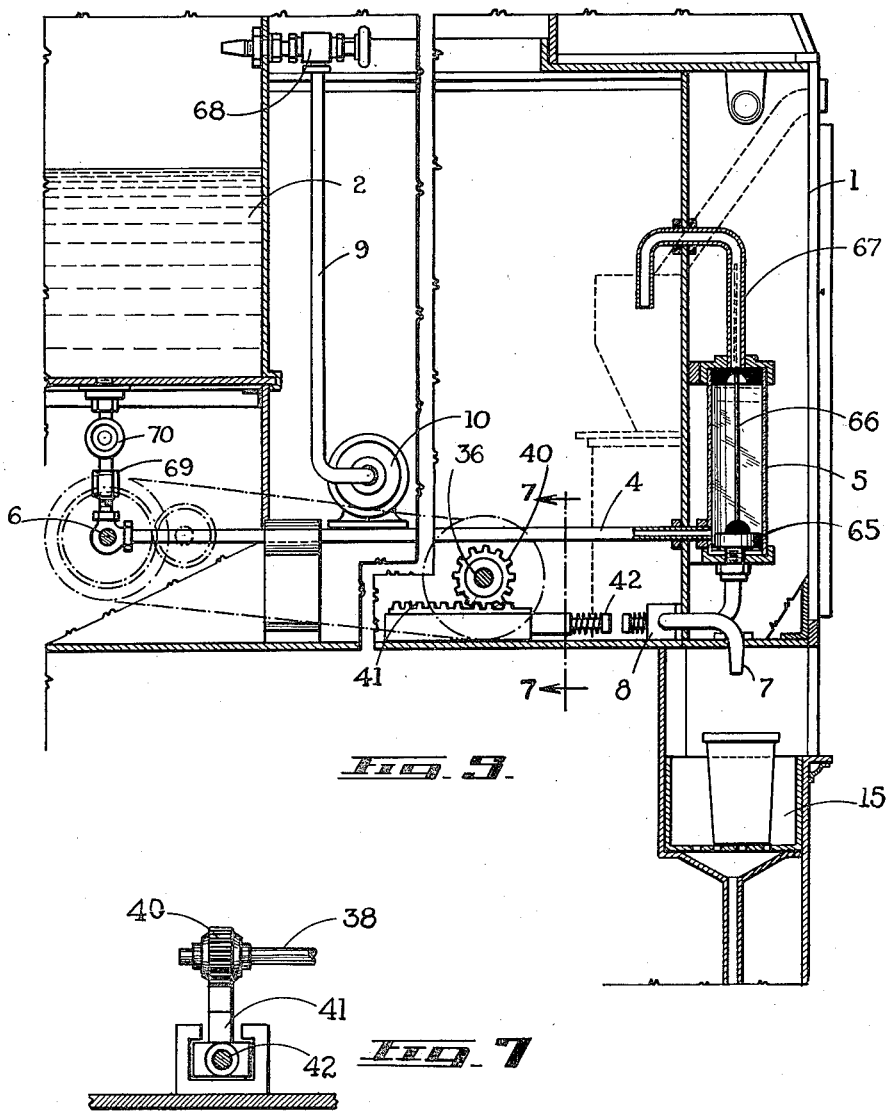
Figure 5 is an enlarged vertical section on a line paralleling Figure 3, showing the liquid measuring parts.

Disposal chutes 60 lead to a removable refuse box 61 to which access is afforded by the door 62. Another door 63 is provided, preferably in the side wall for the storage of a reserve supply of liquid reservoirs 2. A sealer float 65 with guide stem 66 rising into the air outlet pipe 67 is seen in the measuring cylinder 5, in Figure 5. In the same figure the adjustable jet 68 for the air line 9 is clearly shown and the liquid feed coupling 69 and above it the valve 70 that is manually opened after the reservoir is positioned and coupled in.

Operation

Various means to operate this improved liquid dispenser will be apparent with the presently disclosed simplified mechanism to produce the desired train or sequence of events following the depositing of the required coin or token, viz., the feed of the cup to the well below the faucet, the closing of the draw-off valve and opening the reservoir valve to fill the measuring cylinder, the subsequent closing of the latter and opening of the former valves after a suitable elapse of time with the reloading of the cup dispenser and the resetting of the coin-released actuating mechanism.

The coin-tripped weighted wheel may be used simply to operate the required circuit breaker and/or breakers and an electric motor or motors as shown actuate the reverse, reciprocating or two-way movement of the mechanical structures involved. In the instant form, however, I have employed the partial rotation of the shaft of the weighted wheel to give the one-way drive and switch on the electric motor to power the return and reset movement.

Thus on the coin-release of the trigger 23 the weighted wheel 26 rotates clockwise through about 100–120 degrees turning the shaft 38 that by its sprocket gear 37 drives the chain 35 and cross shaft 36 in an anti-clockwise direction to send the cup dispensing carriage forwards to feed the cup, and also close the faucet valve 8. Simultaneously the chain 35 turns the shaft 31 and through the chain drive 33 and shaft 34 opens the reservoir feed valve 6 before snapping on the circuit closer 13.

Thereafter the energized motor 11 through the one-way gear pinion 32 begins to reverse the operations until after due elapse of time for resetting the machine it is snapped off by the chain 28 acting on the circuit closer.

From the foregoing description taken in connection with the accompanying drawings, it will be manifest that a liquid dispensing apparatus is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described my invention, what I claim as new and desire to secure by Letters Patent is:

1. A liquid dispenser comprising a cabinet, a reservoir therein, a measuring chamber connected therewith and an outlet faucet for said chamber, a normally closed valve between said reservoir and said chamber and a normally open valve between said chamber and said faucet, mechanism for said valves so that they operate reversely in substantial synchrony, a gravity-operated one-way drive for said mechanism, a motor-driven return for said gravity-operated drive automatically actuated by said gravity-operated drive and a coin-releasing holding device for said gravity-operated one-way drive mechanism; said holding device being resettable by said automatic, motor-driven return.

2. The combination with the structure set forth in claim 1 wherein said cabinet has a well below said faucet of a cup dispensing device having a chute delivering to said well and a cup-feeding apparatus operable in conjunction with said valve mechanism comprising a reciprocating carriage connected by gearing with said valve mechanism and operable between two positions, in one of which said carriage supports an entire stack of cups and in the other of which it separates and releases into said chute the bottommost cup of the stack while retaining the remander.

3. A liquid dispenser comprising a cabinet, a reservoir therein, a measuring chamber connected therewith, an outlet pipe rising from said measuring chamber, a sealer float in said chamber and a guide stem therefor slidable in said outlet, a faucet for said chamber, a normally closed valve between said reservoir and said chamber and a normally open valve between said chamber and said faucet, mechanism for said valves so that they operate reversely in substantial synchrony, a coin-released, gravity-operated control for said mechanism and automatic means for resetting the mechanism and coin-released, gravity-operated control respectively, wherein said coin-released, gravity-operated control comprises a weighted wheel, a dog projecting therefrom, a trigger-like stop normally engaging said projection and having a coin-engageable tail, a gear train connecting said weighted wheel and said mechanism and means actuated by said weighted wheel for starting and stopping said automatic resetting means.

4. The combination with the structure set forth in claim 3 wherein said automatic resetting means comprises an electric motor and a circuit closer therefor opened and closed by said coin-released, weighted wheel.

5. A liquid dispenser comprising a cabinet, a reservoir therein, a measuring chamber connected therewith, an outlet pipe rising from said measuring chamber, a sealer float in said chamber and a guide stem therefor slidable in said outlet, a faucet for said chamber, a normally closed valve between said reservoir and said chamber and a normally open valve between said chamber and said faucet, mechanism for said valves so that they operate reversely in substantial synchrony, a coin-released, gravity-operated control for said mechanism comprising a weighted wheel, a dog projecting therefrom, a trigger-like stop normally engaging said projection and having a coin-engageable tail, a gear train connecting said weighted wheel and said mechanism, a plunger confronting and engageable with said normally open faucet valve to close the same having a rack-like stem, a gear therefor keyed on a shaft operable by said gear train, and means for resetting said valve mechanism and the coin-released, gravity-operated control comprising an electric motor with a circuit closer therefor opened and closed by said weighted wheel.

6. The combination with the structure set forth in claim 5 of a well in said cabinet below said faucet and a cup dispensing device comprising a vertical supply stack, a chute spaced therebelow and delivering to said well, and a cup feeding apparatus in the form of a reciprocating carriage slidable between the bottom of said stack and said chute and driven by a rack, a gear for said rack on the same shaft as said plunger rack gear and alternative means on said carriage for supporting all the cups in a column and of separating and freeing the bottommost cup while retaining the remainder.

EINO HONGELL.

REFERENCES CITED

The following references are of record in the file of this patent:

UNITED STATES PATENTS

| Number | Name | Date |
|---|---|---|
| 1,936,103 | Berry | Nov. 21, 1933 |
| 2,156,834 | Berry | May 2, 1939 |
| 2,284,880 | Nicholson | June 2, 1942 |
| 2,376,403 | Thompson et al. | May 22, 1945 |
| 2,380,884 | Von Stoser et al. | July 21, 1945 |
| 2,475,511 | Nicholson | July 5, 1949 |